(12) United States Patent
Delachanal (10) Patent No.: US 10,360,942 B1
(45) Date of Patent: Jul. 23, 2019

(54) SYSTEMS AND METHODS FOR CHANGING STORAGE OF VIDEOS

(71) Applicant: GoPro, Inc., San Mateo, CA (US)

(72) Inventor: Christophe Delachanal, Lumbin (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/649,446

(22) Filed: Jul. 13, 2017

(51) Int. Cl.
- *H04N 5/93* (2006.01)
- *G11B 27/00* (2006.01)
- *G11B 27/031* (2006.01)
- *G06K 9/00* (2006.01)

(52) U.S. Cl.
CPC ........ *G11B 27/031* (2013.01); *G06K 9/00751* (2013.01)

(58) Field of Classification Search
USPC .................................. 386/278–284
See application file for complete search history.

(56) References Cited

U.S. PATENT DOCUMENTS

| | | | | |
|---|---|---|---|---|
| 2010/0064239 A1* | 3/2010 | Crawford | G06F 17/30265 | 715/771 |
| 2010/0074590 A1* | 3/2010 | Momosaki | G11B 27/034 | 386/278 |
| 2010/0260468 A1* | 10/2010 | Khatib | G06F 11/0757 | 386/278 |
| 2011/0217019 A1* | 9/2011 | Kamezawa | H04N 9/8042 | 386/224 |
| 2012/0210221 A1* | 8/2012 | Khan | G11B 27/034 | 715/716 |
| 2012/0213497 A1* | 8/2012 | Lou | G11B 27/00 | 386/343 |
| 2013/0104042 A1* | 4/2013 | Meaney | G06F 3/048 | 715/716 |
| 2013/0125000 A1* | 5/2013 | Fleischhauer | G11B 27/031 | 715/723 |
| 2014/0328570 A1* | 11/2014 | Cheng | G11B 27/10 | 386/241 |
| 2016/0014479 A1* | 1/2016 | Gower | H04N 21/23418 | 725/93 |
| 2016/0133295 A1* | 5/2016 | Boyle | G06K 9/00744 | 386/240 |
| 2016/0225410 A1* | 8/2016 | Lee | H04N 21/21805 | |
| 2018/0033463 A1* | 2/2018 | Lee | G06K 9/00718 | |
| 2018/0089512 A1* | 3/2018 | Traff | G06K 9/00335 | |

* cited by examiner

*Primary Examiner* — Nigar Chowdhury
(74) *Attorney, Agent, or Firm* — Esplin & Associates, PC (57) ABSTRACT

Physical storage media may store video information defining video content. The video content may be characterized by video edit information. The video edit information may identify one or more of portions of the video content used in a video edit and/or one or more highlight moments within the video content. The video edit information may be accessed. One or more target portions of the video content may be identified based on the video edit information. The target portion(s) of the video content may not be used in the video edit and/or may not include at least one of the highlight moment(s). The target portion(s) of the video content may be defined by one or more target portions of the video information. The target portions of the video information may be changed.

20 Claims, 5 Drawing Sheets

SYSTEMS AND METHODS FOR CHANGING STORAGE OF VIDEOS

FIELD

This disclosure relates to changing storage of videos by using video edit information identifying video edits and/or highlight moments to identify and change one or more portions of the videos.

BACKGROUND

Storage of large amounts of video files may be resource (time, bandwidth, storage) intensive. Resources required to store video files may make it difficult for resource limited devices (e.g., mobile devices) to use the video files. Resources required to store video files may lead to undesired expenditure of resources.

SUMMARY

This disclosure relates to changing storage of videos. Physical storage media may store video information defining video content. The video content may be characterized by video edit information. The video edit information may identify one or more of portions of the video content used in a video edit and/or one or more highlight moments within the video content. The video edit information may be accessed. One or more target portions of the video content may be identified based on the video edit information. The target portion(s) of the video content may not be used in the video edit and/or may not include at least one of the highlight moment(s). The target portion(s) of the video content may be defined by one or more target portions of the video information. The target portions of the video information may be changed.

A system that changes storage of videos may include one or more of physical storage media, processors, and/or other components. The physical storage media may store video information, video edit information, and/or other information. The video information may define video content and/or other content. The video content may be characterized by the video edit information and/or other information. The video edit information may identify one or more of portions of the video content used in one or more video edits and/or one or more highlight moments within the video content. The video edit information may be part of the video information and/or separate from the video information. The video edit information may be stored with the video information or separately from the video information.

The processor(s) may be configured by machine-readable instructions. Executing the machine-readable instructions may cause the processor(s) to facilitate changing storage of videos. The machine-readable instructions may include one or more computer program components. The computer program components may include one or more of an access component, an identify component, a change component, and/or other computer program components.

The access component may be configured to access the video edit information and/or other information. Accessing video edit information may include one or more of acquiring, analyzing, determining, examining, locating, obtaining, receiving, retrieving, reviewing, storing, and/or otherwise accessing the video edit information. The access component may access video edit information from one or more locations.

The identify component may be configured to identify one or more target portions of the video content based on the video edit information and/or other information. The target portion(s) of the video content may not be used in the video edit(s) and/or may not include at least one of the highlight moment(s). The target portion(s) of the video content may be defined by one or more target portions of the video information.

In some implementations, the identify component may identify the target portion(s) of the video content based on identification of the portion(s) of the video content used in the video edit(s) and/or one or more portions of the video content including one or more of the highlight moment(s). The target portion(s) of the video content may not overlap with the identified portion(s) of the video content.

In some implementations, the identify component may be configured to identify the target portion(s) of the video content further based on a duration of non-use of corresponding portion(s) of the video content. In some implementations, the identify component may be configured to identify the target portion(s) of the video content further based on analysis of the video content. The analysis of the video content may include one or more of activity recognition, face/object recognition, moment recognition, scene recognition, and/or other analysis of the video content.

The change component may be configured to change the target portion(s) of the video information. In some implementations, changing the target portion(s) of the video information may include deleting the target portion(s) of the video information from the physical storage media. In some implementations, changing the target portion(s) of the video information may include effectuating storage of the target portion(s) of the video information in another physical storage media.

In some implementations, changing the target portion(s) of the video information may include generating derivative video information. The derivative video information may define one or more derivative portions of the video content corresponding to and generated from the target portion(s) of the video content. Individual derivative portions of the video content may be characterized by lower fidelity than the corresponding target portions of the video content. Lower fidelity may include one or more of lower resolution, lower framerate, lower number of key frames, higher compression, and/or other lower fidelity.

In some implementations, the change component may be further configured to notify one or more users regarding the change to the target portion(s) of the video information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
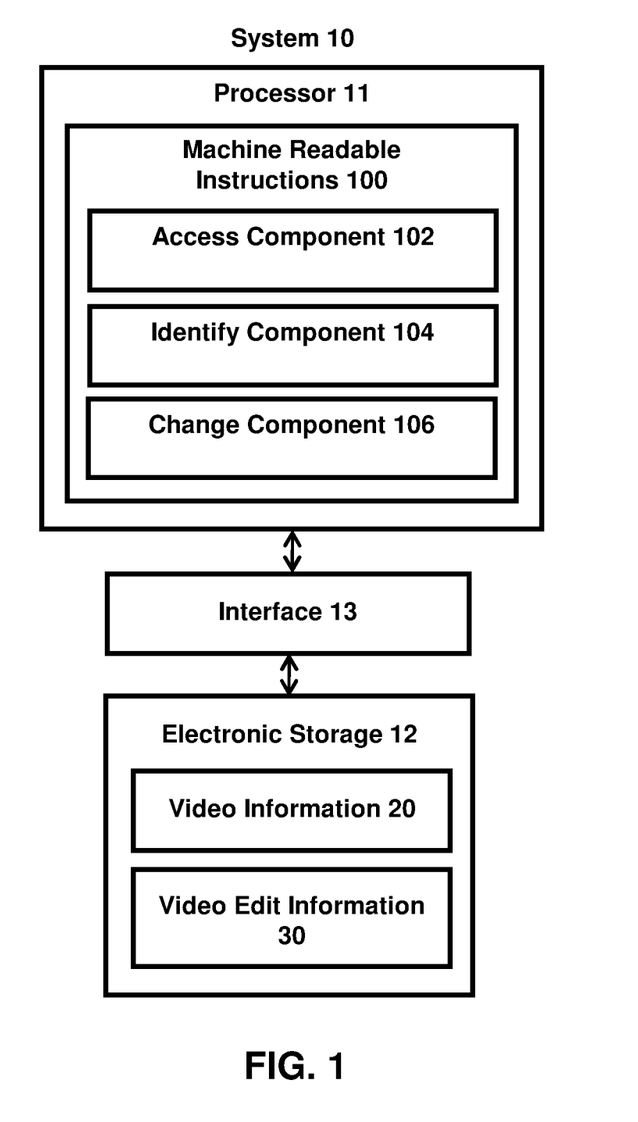
FIG. 1 illustrates an example system that changes storage of videos.

FIG. 1 illustrates a system 10 for changing storage of videos. The system 10 may include one or more of a processor 11, an electronic storage 12, an interface 13 (e.g., bus, wireless interface), and/or other components. The electronic storage 12 may store video information 20 defining video content. The video content may be characterized by video edit information 30. The video edit information 30 may identify one or more of portions of the video content used in a video edit and/or one or more highlight moments within the video content. The video edit information 30 may be accessed by the processor 11. One or more target portions of the video content may be identified based on the video edit information 30. The target portion(s) of the video content may not be used in the video edit and/or may not include at least one of the highlight moment(s). The target portion(s) of the video content may be defined by one or more target portions of the video information 20. The target portions of the video information 20 may be changed.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to one or more of video information, video content, video edit information, video edits, highlight moments, identifying target portions within the video content, target portions of the video content, target portions of the video information, changes to target portions of the video information, and/or other information.

The electronic storage 12 may store video information 20, video edit information 30, and/or other information. The video information 20 and/or the video edit information 30 may be stored in other locations. The video information 20 may define video content and/or other content. Video content may refer to media content that may be consumed as one or more videos. Video content may include one or more videos stored in one or more formats/container, and/or other video content. The video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

Size of the electronic storage medium of the electronic storage 12 may be limited. For example, the electronic storage 12 may be electronic storage of a mobile device or an image capture device, which may have limited storage space. Storage of the video information 20 may require consumption of large amounts of storage space of the electronic storage 12. For example, the video information 20 stored may define video content of long duration and/or high resolution/framerate. Storage of the video information 20 may result in the electronic storage 12 running out of space, which may negatively impact the operation of computing devices using the electronic storage 12. For example, storing many/long video files may consume limited storage space of a mobile device, which may negatively impact the operation of applications running on the mobile device and/or the ability of the mobile device to obtain additional video files.

The video content may be characterized by the video edit information 30 and/or other information. The video edit information 30 may identify one or more of portions of the video content used in one or more video edits and/or one or more highlight moments within the video content. A video edit may refer to an arrangement of one or more portions of video content created by a user and/or a computing system for presentation. A highlight moment may include a moment (e.g., a point and/or a duration) within the video content in which something of interest (e.g., event of interest, action of interest, object/person/scene of interest) occurs/appears.

The video edit information 30 may provide information that allows the processor 11 to identify one or more of portions of the video content used in one or more video edits and/or one or more highlight moments within the video content. For example, the video edit information may include metadata, tag information, and/or other information that describes/indicates which portions of the video content have been used in video edits and/or include highlight moments. The video edit information 30 may provide information that allows the processor 11 to identify one or more of portions of the video content not used in one or more video edits and/or one or more portions of the video content not including one or more highlight moments. For example, the video edit information may include metadata, tag information, and/or other information that describes/indicates which portions of the video content have not been used in video edits and/or do not include highlight moments.

The video edit information 30 may be part of the video information 20 and/or separate from the video information 20. The video edit information 30 may be stored with the video information 20 (e.g., stored as part of the video file, metadata included in the video file) or separately from the video information 20 (stored as a file separate from the video file, metadata not included in the video file).

Figure 3:
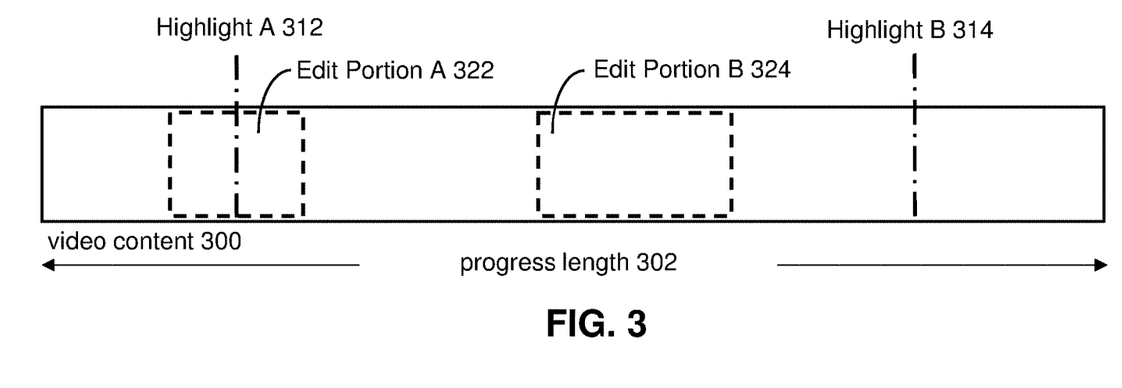
FIG. 3 illustrates an example video content.

FIG. 3 illustrates an example video content 300. The video content 300 may have a progress length 302. Video edit information for the video content 300 may identify/be used to identify the portion(s) of the video content 300 used in video edit(s) and/or one or more highlight moments within the video content 300. Video edit information for the video content 300 may identify/be used to identify the portion(s) of the video content 300 not used in video edit(s) and/or not including one or more highlight moments. The video edit information may identify/be used to identify an edit portion A 322, an edit portion B 324, a highlight A 312, and a highlight B 314. The edit portion A 322 and the edit portion B 324 may be used within the same video edit and/or different video edits. The highlight A 312 may be included within the edit portion A 322.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate changing storage of videos. The machine readable instructions 100 may include one or more computer program components. The machine readable instructions 100 may include one or more of an access component 102, an identify component 104, change component 106, and/or other computer program components.

The access component 102 may be configured to access video edit information and/or other information. Accessing the video edit information may include one or more of acquiring, analyzing, determining, examining, locating, obtaining, receiving, retrieving, reviewing, storing, and/or otherwise accessing the video edit information. The access component 102 may access the video edit information from one or more locations. For example, the access component 102 may access the video edit information from a storage location, such as the electronic storage 12 (the video edit information 30), electronic storage of a device accessible via a network, and/or other locations. The access component 102 may access the video edit information from a hardware component and/or a software component.

The identify component 104 may be configured to identify one or more target portions of the video content based on the video edit information (e.g., the video edit information 30) and/or other information. The target portions of the video content may correspond to particular moments (e.g., particular points/duration within the progress of the video content) in the video content. The target portion(s) of the video content may not be used in the video edit(s) and/or may not include at least one of the highlight moment(s). The target portion(s) of the video content may be defined by one or more target portions of the video information. The target portion(s) of the video information may include those portions (e.g., byte ranges) of the video information that define the target portion(s) of the video content not be used in the video edit(s) and/or not including highlight moment(s). In some implementations, the target portions may be modified based on user input. For example, based on user input (e.g., received through one or more user interfaces), target portions may identified by the identify component 104 be added/removed, and/or beginning and/or ending positions of the target portions may be changed.

Figure 4:
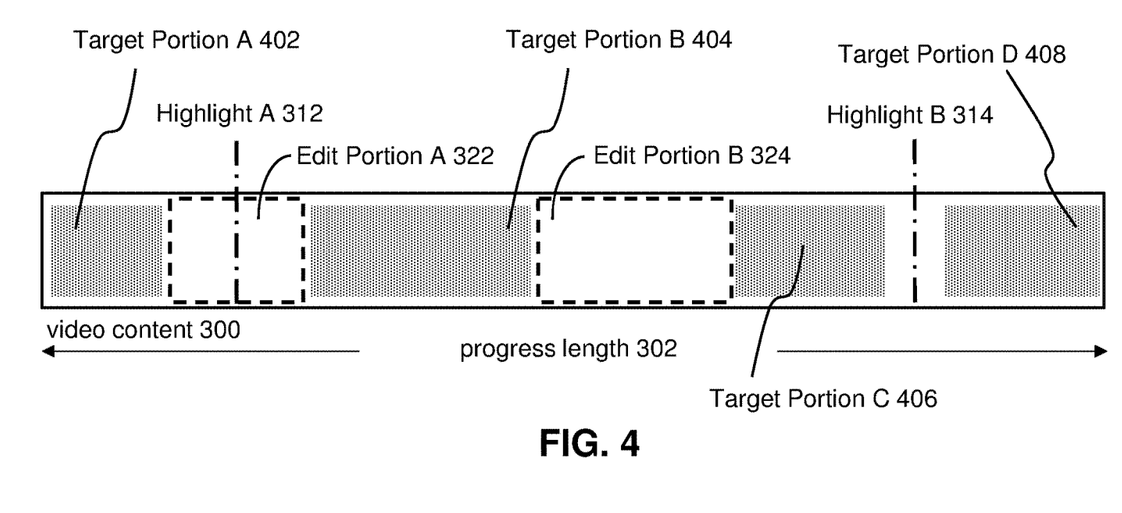
FIGS. 4-5 illustrate example identifications of target portions of video content.

FIG. 4 illustrates an example identification of target portions of the video content 300. Based on the video edit information for the video content 300, the identification component 104 may identify one or more of target portion A 402, target portion B 404, target portion C 406, target portion D 408, and/or other target portions. The target portion A 402 may extend from the beginning of the video content 300 to the beginning of the edit portion A 322. The target portion B 404 may extend from the end of the edit portion A 322 to the beginning of the edit portion B 324. The target portion C 406 may extend from the end of the edit portion B 324 to a point within the video content 300 that is a certain duration/number of frames preceding the highlight B 314. The target portion D 408 may extend from a point within the video content 300 that is a certain duration/number of frames after the highlight B 314 to the end of the video content 300. Although the highlight B 314 is shown in FIG. 4 as being centered between the end of the target portion C 406 and the beginning of the target portion D 408, this is merely an example and is not limiting. In some implementations, a highlight moment may not be centered between the end/beginning of target portions.

The target portions identified around highlight moments may not include certain amounts of video content around the highlight moments. The amounts of the video content preceding the highlight moments and the amounts of the video content after the highlight moments to be not included in the target portions may be the same or different. The amounts of video content around a highlight moment to be not included in the target portion may be set based on user input (e.g., user indicating the amount of "buffer" video content to be preserved around highlight moments), based on default values, and/or based on the highlight moments (e.g., different amounts of video content may be preserved based on different highlight moments, such as automatic vs manual highlight moments and/or highlight moments corresponding to different object/person/scene/event/action).

The target portions identified around portions of the video content used in video edit(s) (edit portions) may include or may not include certain amounts of video content around the edit portions. For example, instead of the target portion A 402 extending to the beginning of the edit portion A 322, the target portion A 402 may stop a certain duration/number of frames before the beginning of the edit portion A 322. Instead of the target portion B 404 extending from the end of the edit portion A 322, the target portion B 404 may begin a certain duration/number of frames after the end of the edit portion A 322.

The amounts of the video content preceding the edit portions and the amounts of the video content after the edit portions to be not included in the target portions may be the same or different. The amounts of video content around an edit portion to be not included in the target portion may be set based on user input (e.g., user indicating the amount of "buffer" video content to be preserved around edit portions), based on default values, and/or based on the edit portions (e.g., different amounts of video content may be preserved based on different types of edits and/or analysis of visuals and/or audio corresponding to the edit portion (e.g., based on identification of different object/person/scene/event/action occurring within the edit portions)).

Figure 5:
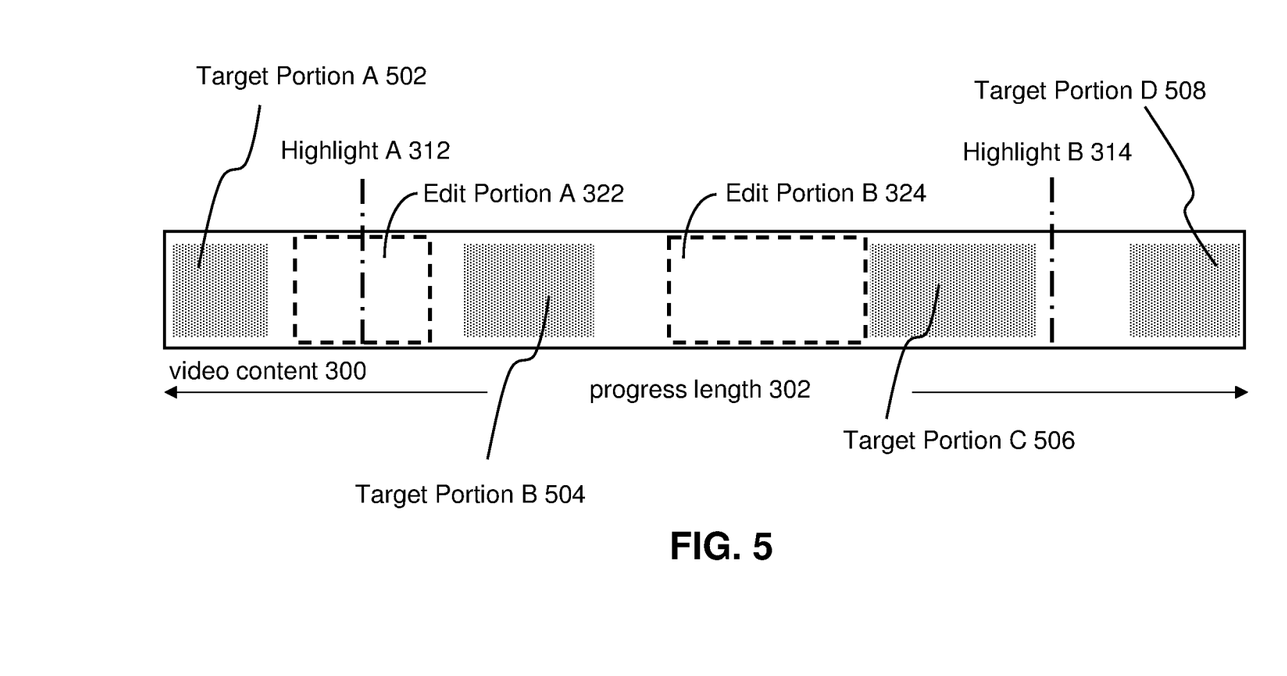

FIG. 5 illustrates an alternative example identification of target portions of the video content 300. Based on the video edit information for the video content 300 (e.g., based on the edit portion A 322, the edit portion B 324, the highlight A 312, and the highlight B 314), the identification component 104 may identify one or more of target portion A 502, target portion B 504, target portion C 506, target portion D 508, and/or other target portions. The target portion A 502 may extend from the beginning of the video content 300 to a certain duration/number of frames before the beginning of the edit portion A 322. The target portion B 504 may extend from a certain duration/number of frames after the end of the edit portion A 322 to a certain duration/number of frames before the beginning of the edit portion B 324. The target portion C 506 may extend from the end of the edit portion B 324 to a point within the video content 300 that is a certain duration/number of frames preceding the highlight B 314. The target portion D 508 may extend from a point within the video content 300 that is a certain duration/number of frames after the highlight B 314 to the end of the video content 300.

The example target portions shown in FIG. 5 may be shorter or longer than the example target portions shown in FIG. 4. The target portion A 502 may be shorter than the target portion A 402. The target portion B 504 may be shorter than the target portion B 404. The target portion C 506 may be longer than the target portion C 406. The target portion D 508 may be shorter than the target portion D 408. Other target portions are contemplated.

In some implementations, one or more target portions may correspond to particular views within the video content. Portions of the video content used in video edit(s) and/or including highlight moment(s) may correspond to smaller views of the video content than available within the video content. For example the video content may include a capture of a scene using 180 degrees capture field of view and a smaller field of view (e.g., 90 degrees viewing field of view) may be used in video edit(s) and/or include highlight moments. The target portions of the video content may correspond to particular views (e.g., particular direction of view/field of view/zoom within the video content, such as the direction of viewing angle/zoom for spherical video content) within the video content not used in video edit(s) and/or not including highlight moment(s) as a function of progress through the video content.

In some implementations, the identify component 104 may identify the target portion(s) of the video content based on identification of the portion(s) of the video content used in the video edit(s) and/or one or more portions of the video content including one or more of the highlight moment(s). For example, based on the video edit information, the identify component 104 may identify the edit portion A 322, the edit portion B 324, a portion of the video content including the highlight A 312, and a portion of the video content including the highlight B 314. Based on the identification of these portions, the identify component 104 may identify the target portions of the video content 300. The target portion(s) of the video content may not overlap with the identified portion(s) of the video content—that is, the identify component 104 may identify target portions of the video content based on a negative (e.g., the target portions include inverse of the portion(s) identified as being used in video edit(s) or including highlight moment(s)).

In some implementations, the identify component 104 may be configured to identify the target portion(s) of the video content further based on a duration of non-use of corresponding portion(s) of the video content. A duration of non-use of a portion of the video content may refer to a duration for which the portion has not been used in a video edit and/or a duration for which the portion has not been viewed (e.g., as part of or separately from a video edit). For example, a portion of the video content may initially not be identified as a target portion because the portion was recently viewed by a user and/or recently used in a video edit. The portion may not be viewed again and/or may not be used in another video edit for a duration of time (duration of non-use). Based on the duration of non-use meeting and/or exceeding a threshold time duration (e.g., six months), the portion may be identified by the identify component 104 as a target portion.

In some implementations, the identify component 104 may be configured to identify the target portion(s) of the video content further based on analysis of the video content. The analysis of the video content may include one or more of activity recognition, face/object recognition, moment recognition, scene recognition, and/or other analysis of the video content. Based on analysis of the video content, the identify component 104 may determine the extent(s) of the target portion(s) of the video content. Based on the analysis of the video content, the target portion(s) of the video content may exclude some portions of the video content that have not been used in video edit/not including highlight moment(s).

For example, a portion of the video content used in a video edit may include a video capture of a part of a birthday party (e.g., blowing out candles on a cake). Based on analysis of the video content, the identify component 104 may identify other portions of the video content as being related to the portion used in the video edit (e.g., displaying the cake, lighting the candles, cutting the cake after the candles have been blown out). Based on the analysis of the video content, the identify component 104 may exclude from the target portions those portions determined to be related to the portion used in the video edit.

Such identification of target portions may enable preservation of an entire segment of the video content corresponding to a sub-segment used in a video edit/including highlight moments. Based on the identification of activity/face/object/moment/scene within the video content, the identification component 104 may determine the beginning(s) and ending(s) of target portions such that an entirety of the relevant segment(s) is preserved.

In some implementations, the identify component 104 may be configured to exclude portions of the video content from target portions based on user preference. User preference may identify one or more types of video content the user desires to preserve. A user may designate to be preserved video content including particular object/person/scene/event/action, and the identify component 104 may exclude portions of the video content including such object/person/scene/event/action from target portions.

The change component 106 may be configured to change the target portion(s) of the video information. In some implementations, changing the target portion(s) of the video information may include deleting the target portion(s) of the video information from the physical storage media storing the video information. For example, the change component 106 may delete target portion (e.g. byte ranges) of the video information 20 corresponding to the target portions of the video content from the electronic storage 12. Such removal of target portions of the video information may effectuate removal of portions of the video content not used in video edits/not including highlight moment(s). Such removal of target portions of the video information may reduce the amount of storage space used to store the video information (e.g., in the electronic storage 12).

In some implementations, changing the target portion(s) of the video information may include effectuating storage of the target portion(s) of the video information in another physical storage media. For example, prior to removal of the target portions of the video information from electronic storage, the change component 106 may create a backup of those portion in another electronic storage (e.g., offloading portions of video content from an electronic storage of a mobile device/image capture device to an electronic storage of a backup device, like a desktop computer, a server, backup hard drive).

In some implementations, changing the target portion(s) of the video information may include generating derivative video information. The derivative video information may define one or more derivative portions of the video content corresponding to and generated from the target portion(s) of the video content. Individual derivative portions of the video content may be characterized by lower fidelity than the corresponding target portions of the video content. Lower fidelity may include one or more of lower resolution, lower framerate, lower number of key frames, higher compression, and/or other lower fidelity. The derivative video information may replace the target portions of the video information in electronic storage. Such generation and storage of derivative video information may enable a user to review the "removed" portion of the video content in lower fidelity.

In some implementations, the change component 106 may change the target portion(s) of the video information using a hierarchy of changes. The changes to be performed to target portion(s) of the video information may be ordered/layered so that the changes to the video information occur in steps. The hierarchy of changes may include different identification of target portions and/or different changes to the target portions at different times.

Figure 6:
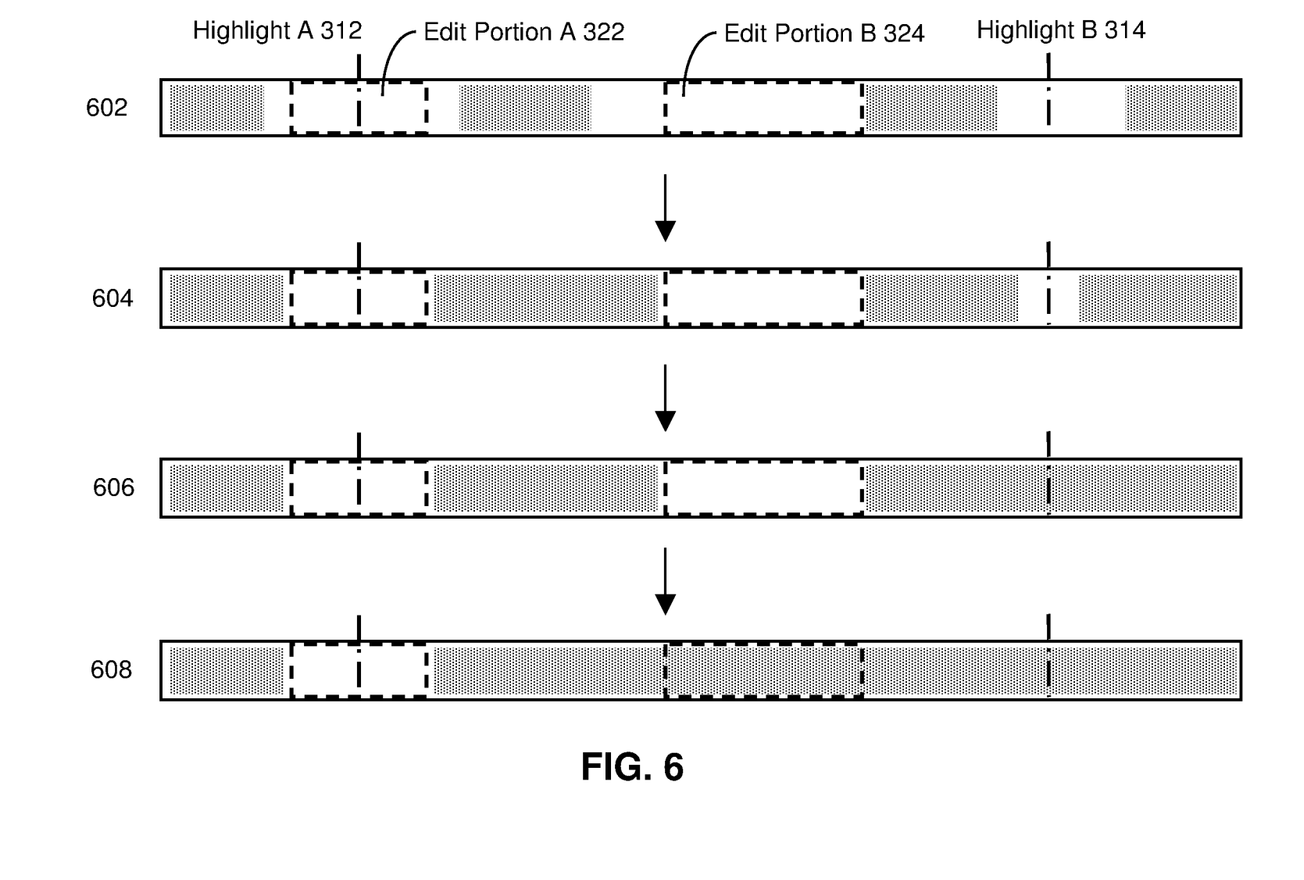
FIG. 6 illustrates example changes to target portions of video content.

FIG. 6 illustrates example changes 602, 604, 606, 608 in target portions of the video content using a hierarchy of changes. As shown in FIG. 6, the video information stored in an electronic storage may be changed first as shown in the change 602. The video information may then be changed as shown in the change 604, where more portions of the video content are identified as target portions (e.g., removal of certain buffer video content surrounding the edit portion A 322, the edit portion B 324, the highlight B 314). The video information may then be changed as shown in the change 606, where a portion of the video content including the highlight B 314 (not used in a video edit) is identified as a target portion and the corresponding portion of the video information is changed. After the change 606, only the portions of the video information used in video edit(s) may remain unchanged. The video information may then be changed as shown in the change 608, where the edit portion B 324 is identified as a target portion and the corresponding portion of the video information is changed. After the change 608, only the portion of the video information used in video edit(s) and containing highlight moment(s) (e.g., edit portion A 322 and highlight A 312) may remain unchanged.

Thus, in the example hierarchy of changes shown in FIG. 6, the change component 106 may prioritize for preservation video information in the following order: (1) portions containing highlight moment(s) and used in video edit(s), (2) portions used in video edit(s), and (3) portions containing highlight moments. In some implementations, prioritization of video information make take into account other factors, such as content recognition, the number of video edits that use the portions (e.g., a portion used in multiple video edits may be prioritized for preservation over a portion used in a single video edit or lower number of video edits), the number of highlight moments within the portions (e.g., a portion including multiple highlight moments may be prioritized for preservation over a portion including a single highlight moment or lower number of highlight moments). Other prioritization of video portions for preservation are contemplated.

The hierarchy of changes may further include ordering of different types of changes to the video information. For example, target portions of the video information may be changed in the following order: (1) being replaced with derivative visual information; and (2) being removed from electronic storage. For example, the change component 106 may initially change portions of the video information by replacing the portions with corresponding derivative video information. The change component 106 may later change the portions of the video information by removing the portions (e.g., derivative portions) from electronic storage.

In some implementations, the hierarchy of changes may further include ordering of different types of derivative video information generation, where the derivative video information is generated using different orderings of lower resolution, lower framerate, lower number of key frames, higher compression, and/or other lower fidelity. For example, a target portion of video information may initially be changed by being replaced with first derivative video information characterized by lower framerate. The target portion of video information (the first derivative video information) may later be changed by being replaced with second derivative video information characterized by lower resolution. In some implementations, the hierarchy of changes may further include ordering of different levels of derivative video information generation (e.g., first generation of derivative video information using a first lower resolution, second generation of derivative video information using a second lower resolution that is lower than the first lower resolution).

In some implementations, the change component 106 may be further configured to notify one or more users regarding change(s) to the target portion(s) of the video information. For example, prior to removal of the target portions of the video information from an electronic storage, the change component 106 may notify a user that the target portions of the video information is about to be removed from the electronic storage. The change component 106 may enable the user to review the corresponding portions of the video content and allow the user to decide whether to continue with the removal of the target portions, reject the proposed removal of the target portions, or postpone the removal of the target portions from the electronic storage. In some implementations, the change component 106 may notify a user whether the target portions to be removed have or have not been backed up in another electronic storage. In some implementations, the change component 106 may enable a user to back up the target portions in another electronic storage prior to removal.

In some implementations, video content may include one or more of spherical video content, virtual reality content, and/or other video content. Spherical video content and/or virtual reality content may define visual content viewable from one or more points of view as a function of progress through the spherical/virtual reality video content.

Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10 (e.g., the remote device 20, the computing device 30). One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 are shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
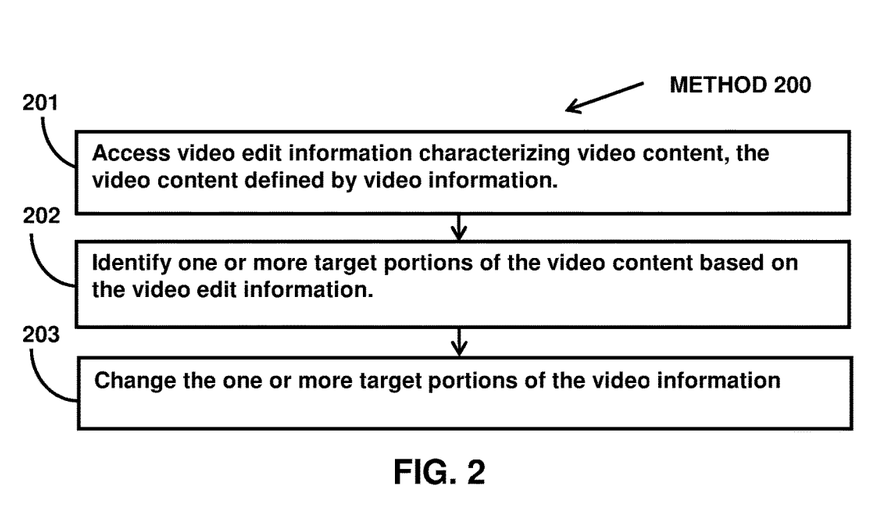
FIG. 2 illustrates an example method for changing storage of videos.

FIG. 2 illustrates method 200 for changing storage of videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video edit information charactering video content may be accessed. The video content may be defined by video information stored in physical storage media. The video edit information may identify one or more of portions of the video content used in a video edit and/or one or more highlight moments within the video content. In some implementations, operation 201 may be performed by a processor component the same as or similar to the access component 102 (Shown in FIG. 1 and described herein).

At operation 202, one or more target portions of the video content may be identified based on the video edit information. The target portion(s) of the video content may not be used in the video edit and/or may not include at least one of the one or more highlight moments. The target portion(s) of the video content may be defined by target portion(s) of the video information. In some implementations, operation 202 may be performed by a processor component the same as or similar to the identify component 104 (Shown in FIG. 1 and described herein).

At operation 203, the target portion(s) of the video information may be changed. In some implementations, operation 203 may be performed by a processor component the same as or similar to the change component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that changes storage of videos, the system comprising:
    physical storage media storing video information defining video content, wherein the video content is characterized by video edit information, the video edit information identifying one or more of portions of the video content used in a video edit and/or one or more highlight moments within the video content; and
    one or more physical processors configured by machine-readable instructions to:
        access the video edit information;
        identify one or more target portions of the video content based on the video edit information, the one or more target portions of the video content not used in the video edit and/or not including at least one of the one or more highlight moments, the one or more target portions of the video content defined by one or more target portions of the video information, wherein the one or more target portions of the video content include a first portion of the video content defined by a first portion of the video information and the one or more target portions of the video content does not include a second portion of the video content defined by a second portion of the video information; and
        change storage of the one or more target portions of the video information such that responsive to identification of the first portion of the video content as one of the one or more target portions, storage of the first portion of the video information within the physical storage media is changed and responsive to non-identification of the second portion of the video content as one of the one or more target targets, storage of the second portion of the video information within the physical storage media is not changed.

2. The system of claim 1, wherein the one or more physical processors are, to change storage of the one or more target portions of the video information, further configured to delete the one or more target portions of the video information from the physical storage media.

3. The system of claim 2, wherein the one or more physical processors are, to change storage of the one or more target portions of the video information, further configured to effectuate storage of the one or more target portions of the video information in another physical storage media.

4. The system of claim 2, wherein the one or more physical processors are, to change storage of the one or more target portions of the video information, further configured to generate derivative video information, the derivative video information defining one or more derivative portions of the video content corresponding to and generated from the one or more target portions of the video content, individual derivative portions of the video content characterized by lower fidelity than the corresponding target portions of the video content.

5. The system of claim 4, wherein lower fidelity includes one or more of lower resolution, lower framerate, lower number of key frames, and/or higher compression.

6. The system of claim 1, wherein the one or more physical processors are further configured by the machine-readable instruction to identify the one or more target portions of the video information further based on a duration of non-use of one or more corresponding portions of the video content.

7. The system of claim 1, wherein the one or more physical processors are further configured to identify the one or more target portions of the video content based on analysis of the video content.

8. The system of claim 7, wherein the analysis of the video content includes one or more of activity recognition, face/object recognition, moment recognition, and/or scene recognition.

9. The system of claim 1, wherein the one or more physical processors are further configured by the machine-readable instructions to notify a user regarding the change to storage of the one or more target portions of the video information.

10. A method for changing storage of videos, the method performed by a computing system including one or more physical processors, the method comprising:
    accessing, by the computing system, video edit information, the video edit information characterizing video content, the video content defined by video information stored in physical storage media, wherein the video edit information identifies one or more of portions of the video content used in a video edit and/or one or more highlight moments within the video content;
    identifying, by the computing system, one or more target portions of the video content based on the video edit information, the one or more target portions of the video content not used in the video edit and/or not including at least one of the one or more highlight moments, the one or more target portions of the video content defined by one or more target portions of the video information, wherein the one or more target portions of the video content include a first portion of the video content defined by a first portion of the video information and the one or more target portions of the video content does not include a second portion of the video content defined by a second portion of the video information; and changing, by the computing system, storage of the one or more target portions of the video information such that responsive to identification of the first portion of the video content as one of the one or more target portions, storage of the first portion of the video information within the physical storage media is changed and responsive to non-identification of the second portion of the video content as one of the one or more target targets, storage of the second portion of the video information within the physical storage media is not changed.

11. The method of claim 10, wherein changing storage of the one or more target portions of the video information includes deleting the one or more target portions of the video information from the physical storage media.

12. The method of claim 11, wherein changing storage of the one or more target portions of the video information includes effectuating storage of the one or more target portions of the video information in another physical storage media.

13. The method of claim 11, wherein changing storage of the one or more target portions of the video information includes generating derivative video information, the derivative video information defining one or more derivative portions of the video content corresponding to and generated from the one or more target portions of the video content, individual derivative portions of the video content characterized by lower fidelity than the corresponding target portions of the video content.

14. The method of claim 13, wherein lower fidelity includes one or more of lower resolution, lower framerate, lower number of key frames, and/or higher compression.

15. The method of claim 10, wherein identifying the one or more target portions of the video information includes identifying the one or more target portions of the video information further based on a duration of non-use of one or more corresponding portions of the video content.

16. The method of claim 10, wherein identifying the one or more target portions of the video content includes identifying the one or more target portions of the video content further based on analysis of the video content.

17. The method of claim 16, wherein the analysis of the video content includes one or more of activity recognition, face/object recognition, moment recognition, and/or scene recognition.

18. The method of claim 10, further comprising notifying, by the computing system, a user regarding the change to storage of the one or more target portions of the video information.

19. A system that changes storage of videos, the system comprising:

physical storage media storing video information defining video content, wherein the video content is characterized by video edit information, the video edit information identifying one or more of portions of the video content used in a video edit and/or one or more highlight moments within the video content; and one or more physical processors configured by machine-readable instructions to:

access the video edit information;

identify one or more target portions of the video content based on the video edit information and a duration of non-use of one or more corresponding portions of the video content, the one or more target portions of the video content not used in the video edit and/or not including at least one of the one or more highlight moments, the one or more target portions of the video content defined by one or more target portions of the video information, wherein the one or more target portions of the video content include a first portion of the video content defined by a first portion of the video information and the one or more target portions of the video content does not include a second portion of the video content defined by a second portion of the video information;

change storage of the one or more target portions of the video information by deleting the one or more target portions of the video information from the physical storage media such that responsive to identification of the first portion of the video content as one of the one or more target portions, the first portion of the video information within the physical storage media is deleted and responsive to non-identification of the second portion of the video content as one of the one or more target targets, the second portion of the video information within the physical storage media is not deleted; and notify a user regarding the change to storage of the one or more target portions of the video information.

20. The system of claim 19, wherein the one or more physical processors are, to change storage of the one or more target portions of the video information, further configured to:

effectuate storage of the one or more target portions of the video information in another physical storage media; and generate derivative video information, the derivative video information defining one or more derivative portions of the video content corresponding to and generated from the one or more target portions of the video content, individual derivative portions of the video content characterized by lower fidelity than the corresponding target portions of the video content.

* * * * *